United States Patent [19]
Yoneyama

[11] Patent Number: 5,845,541
[45] Date of Patent: Dec. 8, 1998

[54] MICROMANIPULATOR FINE CONTROL APPARATUS

[75] Inventor: Shinji Yoneyama, Tokyo, Japan

[73] Assignee: Narishige Co., Ltd., Tokyo, Japan

[21] Appl. No.: 882,502

[22] Filed: Jun. 25, 1997

[30] Foreign Application Priority Data

Jun. 26, 1996  [JP]  Japan .................................... 8-165454

[51] Int. Cl.⁶ .............................. G02B 21/32; G05D 3/00
[52] U.S. Cl. ................................. 74/490.12; 74/471 XY; 74/479.01; 414/2; 414/4
[58] Field of Search .......................... 74/490.12, 479.01, 74/490.13, 471 XY; 414/2, 4, 1, 7

[56] References Cited

U.S. PATENT DOCUMENTS

| | | | |
|---|---|---|---|
| 3,204,584 | 9/1965 | Mladjan | 74/471 X |
| 4,749,270 | 6/1988 | Endo et al. | 359/392 |
| 4,946,329 | 8/1990 | Krueger | 74/479.01 |

FOREIGN PATENT DOCUMENTS

| | | |
|---|---|---|
| 1230640 | 12/1966 | Germany . |
| 2186706 | 8/1987 | United Kingdom . |
| 2304398 | 3/1997 | United Kingdom . |

*Primary Examiner*—Rodney H. Bonck
*Assistant Examiner*—William C. Joyce
*Attorney, Agent, or Firm*—Cushman Darby&Cushman IP Group of Pillsbury Madison & Sutro LLP

[57] ABSTRACT

A micromanipulator fine control apparatus of the present invention is operated with a mouse. As the mouse is moved to the front, rear, left and right, a control handle is tilted to the front, rear, left and right, respectively, and a fore and aft fine control slider and a first left right fine control slider are moved in the respective directions. Then, a liquid amount of a first liquid-operated cylinder is varied by fore and aft slider movement, and a liquid amount of a second liquid-operated cylinder is varied by the left right slider movement. Accordingly, the micromanipulator is finely moved in the same direction as the mouse is moved.

3 Claims, 8 Drawing Sheets

MICROMANIPULATOR FINE CONTROL APPARATUS

BACKGROUND OF THE INVENTION

1. Field of the Invention

The present invention relates to a micromanipulator fine control apparatus which can remotely control microtools such as glass electrodes under microscopes by liquid pressure such as oil pressure.

2. Description of Related Art

In the field of basic medical science or biotechnology, there are micromanipulators for treating cells in various manners, for example, retaining, suctioning, injecting and dividing for organ of creatures, cellular texture and egg cells. These cells are treated in various manners by finely controlling the micromanipulator with microscopes. When an operator finely controls the micromanipulator as directly touching a control handle of the micromanipulator, his hand trembling may be multiplied and transmitted to the micromanipulator through a body frame. Therefore, the micromanipulator needs to be gently operated without hand trembling, which requires the complicated operations, the greatest possible care and a lot of skills. In order to solve these problems, there has been offered liquid-operated micromanipulators which can finely and remotely control with hydraulic pressure, e. g., oil pressure.

FIG. 1 is a schematic view briefly showing the structure of a conventional cell treatment device.

In FIG. 1, the cell treatment device comprises a stage 93 for mounting a Petri dish 92 containing the egg cells 91 dipped in a reagent therein, a fixed retaining unit 94 for fixedly retaining the cells 81, a micromanipulator 95 for carrying out the practical cell treatment, and an optical system 96 for observing images of the cells 91 irradiated with light. The cell treatment device is operated on a vibration-proof mat 97.

The micromanipulator 95 is provided with various kinds of microtools 98 such as glass electrodes corresponding to the respective cell treatment, and a three dimensional displacement mechanism for moving a tip of the microtool 98 in three dimensions. The three dimensional displacement mechanism is finely operated, e.g., with hydraulic pressure through a joystick 99 which is controlled by an operator.

The joystick 99 comprises a control handle 102 vertically suspended from the distal end of a supporting frame 101 having a visor shape and a transmitting unit 104 for transmitting oscillation in two directions 103 (shown by arrows in FIG. 1) of the control handle 102.

The joystick 99 is for finely controlling the two dimensional movement of the micromanipulator 95 by handling the control handle 102.

The control handle 102 has a converting unit 105 for converting the oscillation in two directions (indicated by arrows) 103 crossing at a right angle into a mechanical displacement in a horizontal plane.

In conventional devices, besides one with the suspended control handle, there is a device with the control handle vertically stood from the converting part 105. However, recently the devices with the suspended control handle is widely used because the operators can operate the device at the lower position without raising their arms.

Further, there is a device having a mechanism for finely controlling the vertical movement of an object to be treated in order to meet the requirement of vertical movement of an object to be treated in the three dimensional displacement mechanism.

In the system that the three dimensional displacement mechanism of the micromanipulator is actuated with the hydraulic pressure such as oil pressure through the fine-control joystick, the operator tilts and moves the control handle of the joystick into the desired angle and direction to move the tip of the microtool mounted on the micromanipulator to the desired position while looking it through the microscope. Although the operator intends to horizontally move the microtool of the micromanipulator, actual operation is to tilt the control handle of the joystick, which makes the operation difficult.

Further, after the operator moved the tip of the microtool to the desired position by tilting and moving the control handle of the joystick, when the operator let go of the control handle, the control handle is moved a little since it is not held. Accordingly, the tip of the microtool is moved a little from the desired position.

BRIEF SUMMARY OF THE INVENTION

Today is the computer age. Mouses are widely used as input devices for indicating the position on a screen of a display, e.g., a CRT display of a computer. Accordingly, in this computer age, as the input devices, the mouses are demanded for remotely controlling the micromanipulator, not the joystick.

Therefore, it is an object of the present invention to provide a micromanipulator fine control apparatus which solves the above-stated problems and which can horizontally move operating means, a mouse, and which does not cause the position displacement of the tip of the microtool even though the operator has let go of the operating means.

In order to achieve the above object, a micromanipulator fine control apparatus for finely controlling a microtool of a micromanipulator of the present invention comprises 1) a first moving unit for sliding in the fore and aft directions, having a vertical through hole, 2) an adjusting member having a screw part to be inserted into the through hole of the first moving unit, and a fixed ball on the screw part, 3) a second moving unit for sliding in the left and right directions, having a vertical through hole, a movable ball rotatably supported by the through hole of the second moving unit, having a control handle projecting upwards and a cylindrical inner surface which is in contact with an outer surface of the fixed ball, 4) a base plate for slidably supporting the first and second moving units in the corresponding directions, 5) a supporting ball having a through hole, for supporting the upper portion of the control handle inserted into the through hole of the supporting ball, 6) a horizontal movement operating means including a tapered hollow having a larger diameter towards the open lower surface, and a through hole at the top of the hollow, the horizontal movement operating means being slidably provided on the base plate above the upper surface of the control handle, the horizontal movement operating means being for rotatably supporting the supporting ball at the through hole at the top of the hollow, 7) a fore and aft fine control liquid-operated means provided between the base plate and the first moving unit, having a first liquid-operated cylinder coupled to a fore and aft fine control liquid-operated cylinder of the micromanipulator with a first hose, and a first piston movably fitted to the first liquid-operated cylinder, the fore and aft fine control liquid-operated means for varying the amount of liquid of the first liquid-operated cylinder by moving the first moving unit, and 8) a left right fine control liquid-operated means provided between the base plate and the second moving unit, having liquid-operated cylinder of the micromanipulator with a second hose, and a second piston movably fitted to the second liquid-operated cylinder, the left right fine control liquid-operated means for varying the amount of liquid of the second liquid-operated cylinder by moving the second moving unit.

When the horizontal movement operating means is moved to the front, rear, left and right, the control handle being tilted to the front, rear, left and right, respectively, the first moving unit and the second moving unit are moved, and the amount of liquid in the first liquid-operated cylinder is varied by the fore and aft fine control liquid-operated means. Then the amount of liquid in the second liquid-operated cylinder is varied by the left right fine control liquid-operated means, and the micromanipulator is finely moved in the same direction as the moving direction of the horizontal movement operating means.

Here, the fore and aft fine control liquid-operated means may comprise a first bearing metal fixed to one of the base plate and the first moving unit, a first fine control screw shaft screwed into the first bearing metal, and a fore and aft fine control handle fixed to an end of the first fine control screw shaft. The first piston of the fore and aft fine control liquid-operated means is fixed at the end of the first fine control screw shaft, and the first piston slides in the first liquid-operated cylinder by rotating the fore and aft fine control handle. The left right fine control liquid-operated means may comprise a second bearing metal fixed to one of the base plate and the second moving unit, a second fine control screw shaft screwed into the second bearing metal, and a left right fine control handle fixed to an end of the second fine control screw shaft. The second piston of the left right fine control liquid-operated means is fixed at the end of the second fine control screw shaft, and the second piston slides in the second liquid-operated cylinder by rotating the left right fine control handle.

Furthermore, the horizontal movement operating means may comprise vertical fine control liquid-operated means for the vertical movement of the micromanipulator; and the vertical fine control liquid-operated means comprises a third liquid-operated cylinder coupled to a vertical fine control liquid-operated cylinder of the micromanipulator with a third hose, a third bearing metal, a third fine control screw shaft screwed into the third bearing metal, a vertical fine control handle fixed to an end of the third fine control screw shaft, and a third piston movably fitted to the third liquid-operated cylinder and fixed to the end of the third fine control screw shaft. The third piston slides in the third liquid-operated cylinder by rotating the vertical fine control handle.

According to the micromanipulator fine control apparatus of the present invention with the above-described structure, when the operator holds and moves the horizontal movement operating means to the front, rear, left and right while looking through the microscope, the micromanipulator is finely moved to the same directions as the horizontal movement operating means, so that the micromanipulator can finely be moved to the direction that the operator moves the mouse, that is the horizontal movement operating means. Accordingly, the micromanipulator can readily be operated and the operability can be improved.

Further, although the operator has let go of the horizontal movement operating means, since the control handle is held by the horizontal movement operating means, the microtool placed on the micromanipulator is not moved.

Furthermore, the horizontal movement operating means is a mouse, so that an operator readily holds and operates it.

PREFERRED EMBODIMENTS OF THE INVENTION

The preferred embodiments of a micromanipulator fine control apparatus of the present invention will be described with reference to the accompanying drawings.

Figure 1:
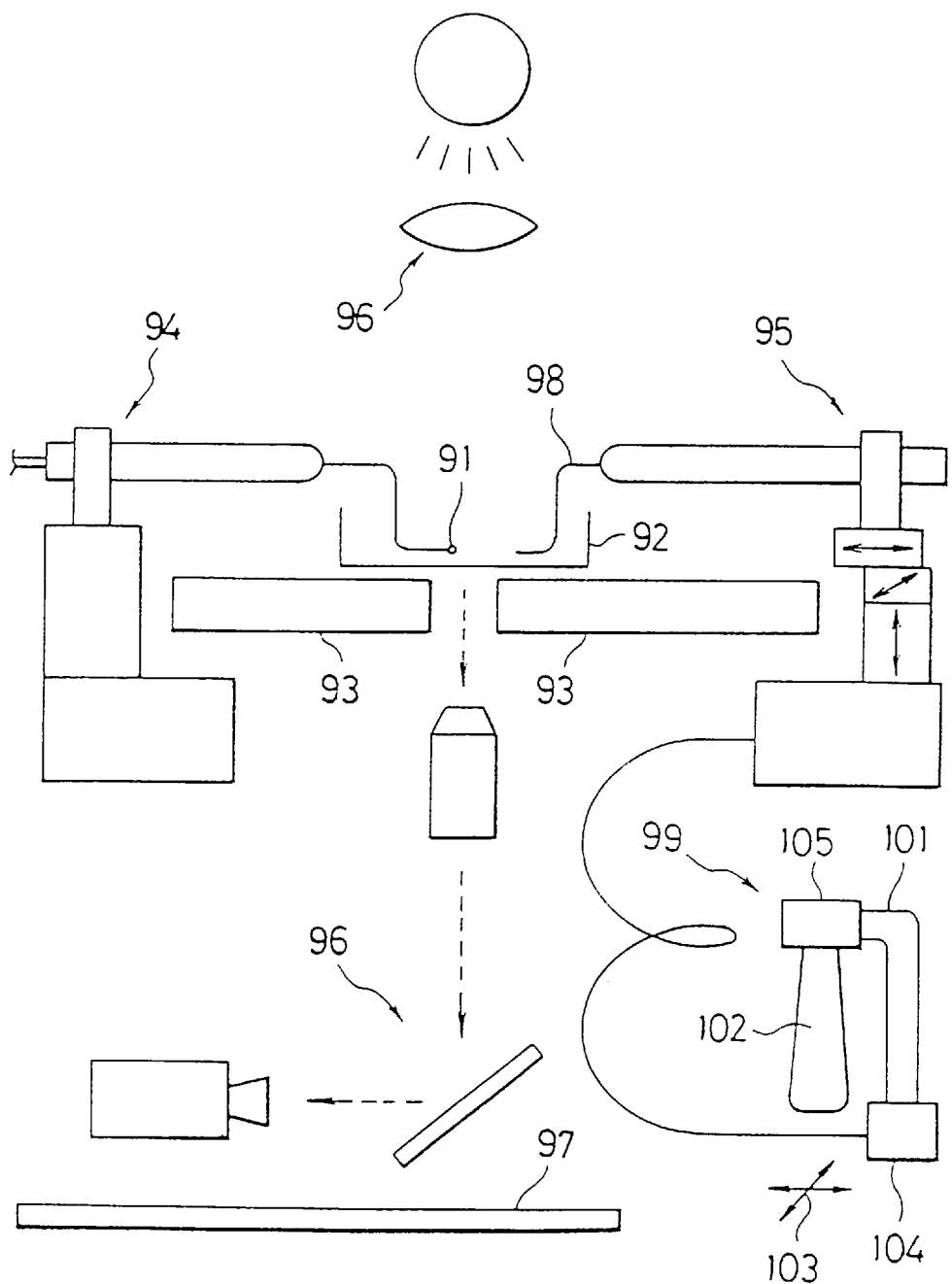
FIG. 1 is a schematic view briefly showing the structure of a conventional cell treatment device.
Figure 2:
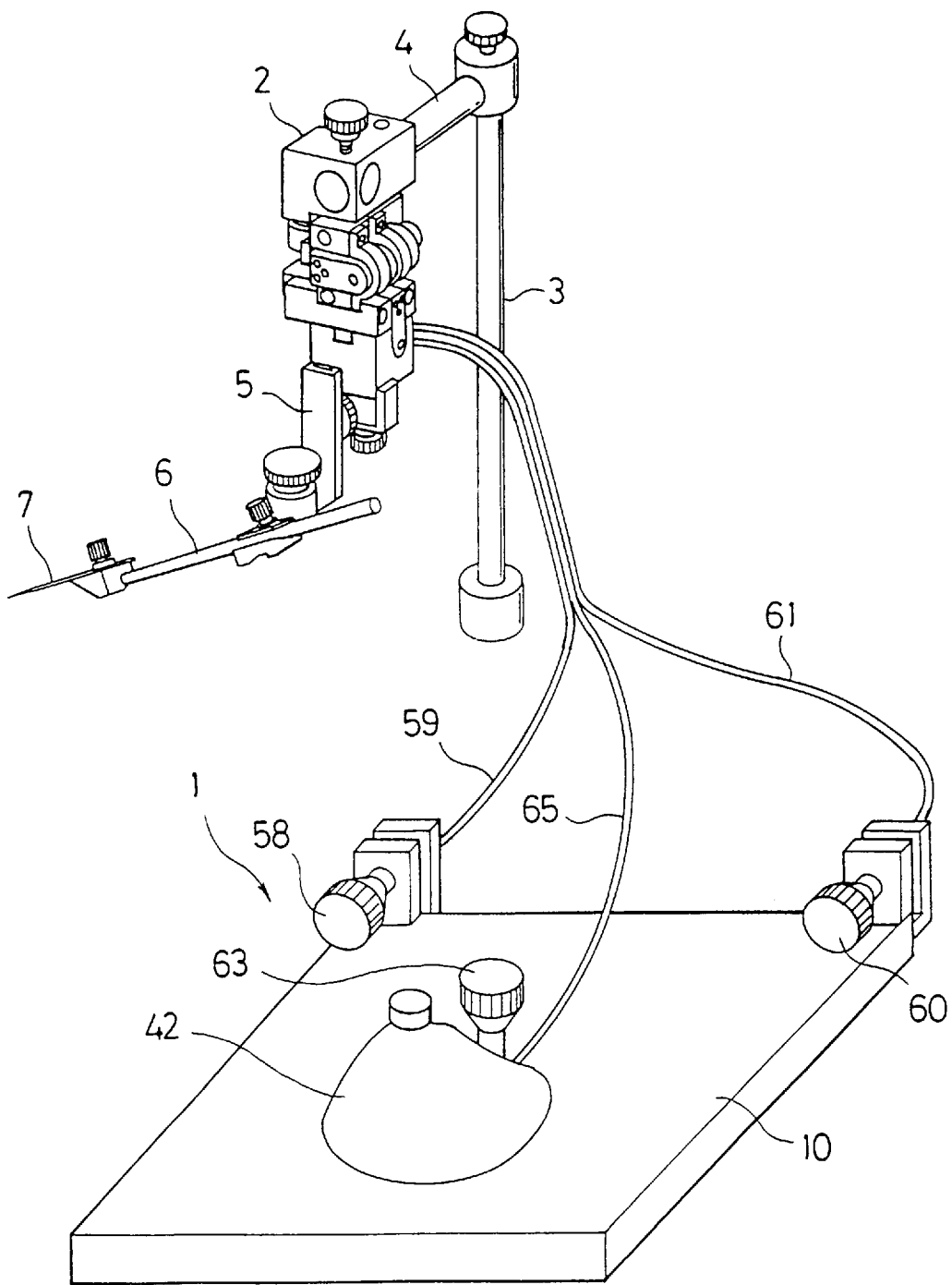
FIG. 2 is a perspective view showing a micromanipulator fine control apparatus according to the present invention installed in the micromanipulator.

FIG. 2 is a perspective view showing a micromanipulator fine control apparatus of the present invention mounted on a three dimensional, liquid-operated micromanipulator. As shown in FIG. 2, the micromanipulator fine control apparatus 1 is connected to a three dimensional, liquid-operated micromanipulator 2 (hereinafter called micromanipulator) through hoses 59, 61, 65 which will be described later, and the micromanipulator 2 is fixed at a mounting bar 4 supported by a pole 3. Further, the micromanipulator 2 holds a tightening device 5 and a glass electrode 7 with a holder 6.

Figure 3:
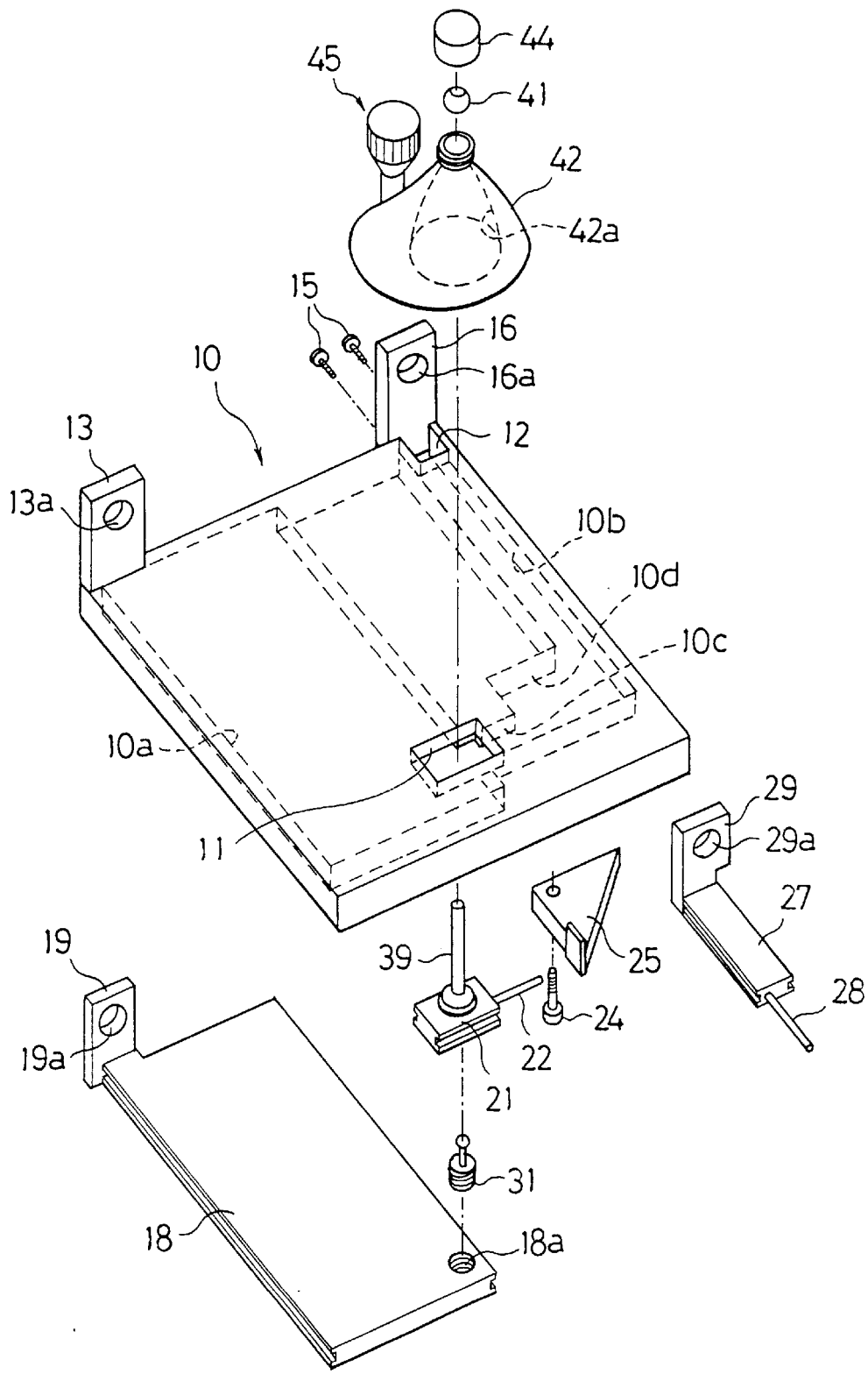
FIG. 3 is an exploded perspective view showing the base plate of the micromanipulator fine control apparatus of the present invention.

FIG. 3 is an exploded view showing a base plate of the micromanipulator fine control apparatus. As shown in FIG. 3, the micromanipulator fine control apparatus 1 comprises a base plate 10 which has a rectangular hole 10a at the left portion of the back surface and a long thin rectangular hole 10b at the right portion of the back surface. The rectangular hole 10a and the rectangular hole 10b are closed at the front and communicated with coupling member holes 10c, 10d at the rear. The base plate 10 also comprises a small rectangular hole 11 at the center of the front portion, which is communicated with the rectangular hole 10a. Further, the base plate 10 comprises a small rectangular through hole 12 at the upper surface of the back portion of the rectangular hole 10b.

A handle support plate 13 having a through hole 13a is placed at the left end of the back portion of the base plate 10, and a cylinder support plate 16 is fixed so as to extend upwards at the rear end of the rectangular hole 12 by bolts 15.

A fore and aft fine control slider 18 is fitted to the rectangular hole 10a of the base plate 10 through a linear way bearing (not shown) so as to be slidable in the lengthwise directions. The fore and aft fine control slider 18 has a female screw 18a at the position under the rectangular through hole 11, and is provided with a cylinder support plate 19 having a through hole 19a at the left rear end. The through hole 19a of the cylinder support plate 19 is placed at substantially the same height of the through hole 13a of the handle support plate 13.

A first left right fine control slider 21 is fitted to the rectangular through hole 11 through a linear way bearing (not shown) so as to be slidable in the left and right directions. A bar 22 is placed at the right side of the first left right fine control slider 21 to extend to the coupling member hole 10c. The tip of the bar 22 is rotatably supported by a pin 24 in the coupling member hole 10d and in contact with one of the sides other than hypotenuse of a right-angled triangular link 25. The other side of the triangular link 25 other than the hypotenuse is in contact with the tip of a bar 28 projecting from a second left right fine control slider 27 fitted to the sides of the rectangular hole 10b through a linear way bearing (not shown) so as to be slidable in the fore and aft directions.

The second left right fine control slider 27 comprises a handle support plate 29 projecting therefrom having a through hole 29a at the rear end. The through hole 29a of the handle support plate 29 is placed at the same height as the through hole 16a of the cylinder support plate 16. The second left right fine control slider 27 and the handle support plate 29 are slidable in the fore and aft directions of the rectangular through hole 12.

Figure 4:
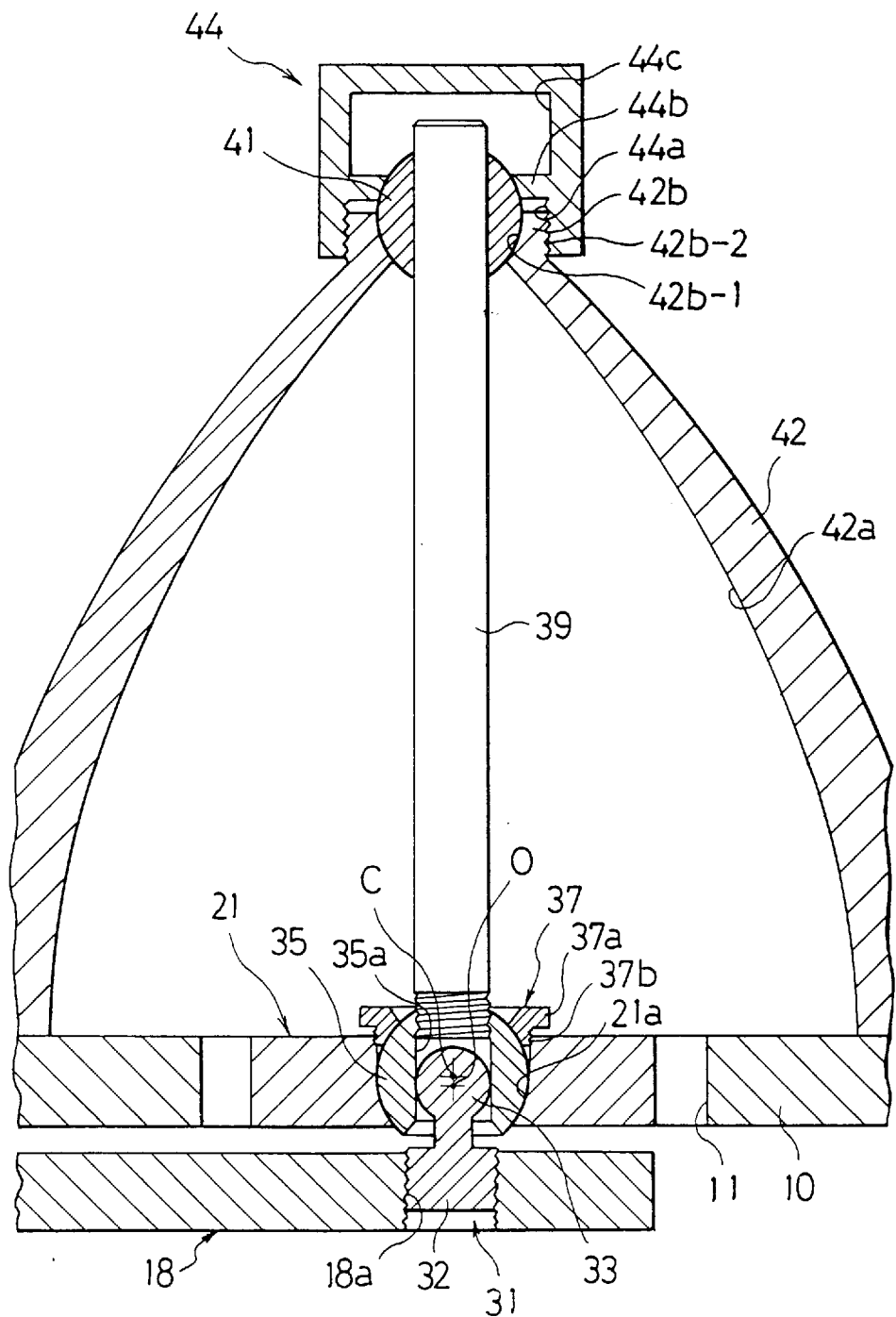
FIG. 4 is a front sectional view showing a mouse portion of the micromanipulator fine control apparatus according to the present invention.

As shown in FIG. 4, an adjusting member 31 for adjusting the fine control rate is screwed into the female screw 18a of the fore and aft fine control slider 18. The adjusting member 31 is constituted with a screw portion 32 screwed to the female screw 18a of the fore and aft fine control slider 18, and a fixed ball 33 placed at the top of the screw portion 32. The adjusting member 31 is vertically moved by rotating the screw portion 32 with a tool such as a screwdriver.

Further, there provided a through hole 21a having a large diameter substantially at the center of the first left right fine control slider 21, which has a female screw at an upper portion and which is tapered so as to have the smaller diameter toward a lower portion and which has a curved surface so as to support a lower portion of a movable ball 35 to prevent the movable ball 35 from removing from the lower portion.

A movable ball fixture 37 supporting an upper portion of the movable ball 35 is screwed into the female screw of the through hole 21a of the first left right fine control slider 21. The movable ball fixture 37 is substantially cylindrical and has a lock portion 37a at the upper part and a curved surface 37b at the lower part to prevent the movable ball 35 from removing upwards.

The movable ball 35 has a cylindrical hole 35a, and the outer surface of the fixed ball 33 placed at the upper portion of the fore and aft fine control slider 18 is in contact with the cylindrical hole 35a (cylindrical inner surface). The upper portion of a control handle 39 is screwed into the upper portion of the cylindrical hole 35a of the movable ball 35.

Further, the end of the control handle 39 is slidably inserted into a cylindrical through hole of a supporting ball 41.

There is mounted a mouse 42 which is a horizontal control means so as to be slidable on the base plate 10. The mouse 42 has a mountain shape and has a conical hollow 42a with the open lower end, a curved surface for supporting the lower portion of the supporting ball 41 at the top portion 42b to prevent the supporting ball 41 from removing downward, a through hole $42b_1$ connected to the top of the hollow 42a, and a male screw $42b_2$ at the outer surface of the top portion 42b.

Further, a cylindrical cap 44 having a female screw 44a at the lower inner surface is screwed into the male screw $42b_2$ of the top portion 42b. The cap 44 has a supporting ball supporting portion 44b having a curved surface for supporting the upper portion of the supporting ball 41 to prevent the supporting ball 41 from removing upwards, and a hollow 44c above the supporting ball supporting portion 44b.

With such structure, when the mouse 42 is moved in the fore and aft, and left and right directions, the control handle 39 is tilted in the fore and aft, and left and right directions, respectively.

The mouse 42 further comprises a vertical fine control operation mechanism 45 at the rear portion of the mouse 42 (see FIG. 3).

Let the center of the fixed ball 33 being O and the center of the movable ball 35 (central point of the tilting motion of the control handle 39) being C. If the center O and the center C are matched, the movable ball 35 is rotated around the center O. There is no fluctuation of physical relation among the fixed ball 33, the movable ball 35, and the fore and aft fine control slider 18 and the left right fine control slider 21 which are a movable body.

However, if the center O and the center C are unmatched, for example, when the control handle 39 is tilted in the left and right directions, the movable ball 35 together with the control handle 39 is oscillated around the center O since the fixed ball 33 is fixed in the left and right directions. Accordingly, the first left right fine control slider 21 is pushed back and smoothly moved in the oscillating direction around the center O.

On the other hand, when the control handle 39 is tilted in the fore and aft directions, the fixed ball 33 is oscillated around the center C since the fixed ball 33 is movable in the fore and aft directions. Accordingly, the fore and aft fine control slider 18 is pushed back and smoothly moved in the oscillating direction around the center C.

Further, a control mechanism for the fine control ratio is constituted to control the fine control ratio by changing the screwing amount of the adjusting member 31 into the fore and aft fine control slider 18 so as to vertically move the fixed ball 33 along the cylindrical hole 35a of the movable ball 35 to vary the central distance between the fixed ball 33 and the movable ball 35.

Next, a fore and aft fine control operation mechanism 47 provided at the handle support plate 13 and the cylinder support plate 19 will be explained.

Figure 5:
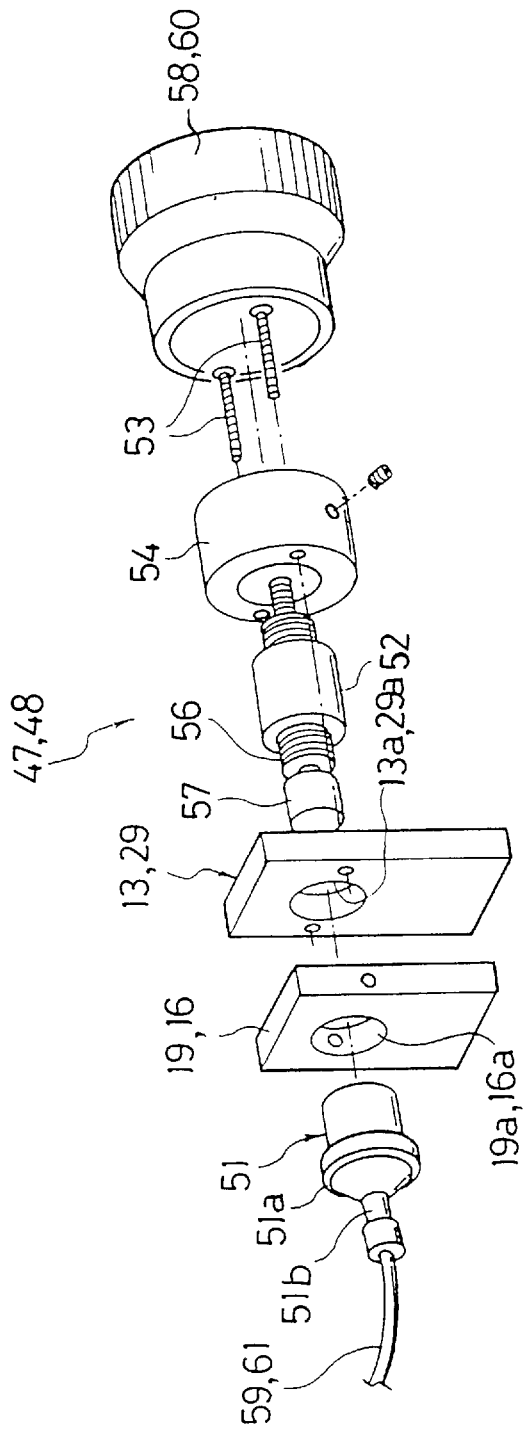
FIG. 5 is an exploded perspective view showing a fore and aft fine control operation mechanism and a right left fine control operation mechanism.

FIG. 5 is an exploded perspective view of the fore and aft fine control operation mechanism 47 and the left right fine control operation mechanism 48. As shown in FIG. 5, a hydraulic cylinder 51 is fitted into the circular through hole 19a of the cylinder support plate 19 placed at the left end of the fore and aft fine control slider 18, and a lock portion 51a of the hydraulic cylinder 51 is in contact with the limb of the through hole 19a. The hydraulic cylinder 51 has a cylindrical shape having one open end and comprises the lock portion 51a at the outer surface and a hose fixture 51b at the closed end. Then, a piston 57 which will be described later is slidably fitted into the hydraulic cylinder 51, and an oil reservoir is formed between the hydraulic cylinder 51 and the piston 57.

Accordingly, the fore and aft fine control slider 18 together with the cylinder support plate 19 and the hydraulic cylinder 51 is movable in the fore and aft directions.

Further, a distal end of a bearing metal 52 is fitted into the through hole 13a of the handle support plate 13 fixed at the left end of the rear portion of the base plate 10. The bearing metal 52 is further fitted into the central hole of a bearing metal setting 54 fixed at the handle support plate 13 by bolts 53. A female screw is formed at a through hole of the bearing metal 52, and a male screw of a fine control screw shaft 56 is screwed into the female screw. A cylindrical piston 57 is fixed at the end of the fine control screw shaft 56. The piston 57 can freely pass through the through hole 13a of the handle support plate 13 and be slidable in the hydraulic cylinder 51.

Further, the end of the fine control screw shaft 56 is rotatably fitted into the bearing metal setting 54 and fixed at a fore and aft fine control handle 58 having one open end and knurling formed on the outer surface at the other closed end.

When the fore and aft fine control handle 58 is rotated, the fine control screw shaft 56 is rotated and moved in the fore and aft directions since the male screw of the fine control screw shaft 56 is screwed into the female screw of the bearing metal 52. Then, the piston 57 also slides in the hydraulic cylinder 51.

One end of the hose 59 is connected to the hose fixture 51b communicating with the oil reservoir of the hydraulic cylinder 51 through a small hole, and the other end of the hose 59 is connected to a Y-axis hydraulic cylinder 73 which will be described later.

A left right fine control operation mechanism 48 provided at the handle support plate 29 and the cylinder support plate 16 is constituted in the same way as the fore and aft fine control operation mechanism 47. When a left right fine control handle 60 is rotated, the fine control screw shaft 56 is rotated and moved in the fore and aft directions. Then, the piston 57 is also moved in the fore and aft directions.

One end of the hose 61 is connected to the hose fixture 51b of the hydraulic cylinder 51, and the other end of the hose 61 is connected to an X-axis hydraulic cylinder 63 which will be described later.

Figure 6:
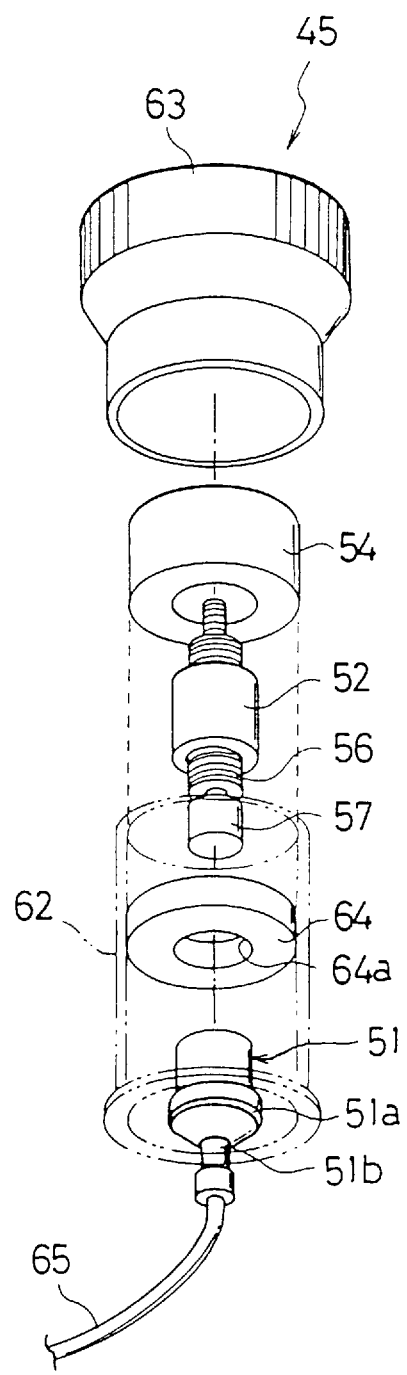
FIG. 6 is an exploded perspective view showing a vertical fine control operation mechanism.

FIG. 6 is an exploded perspective view of the vertical fine control operation mechanism 45. As shown in FIG. 6, a cylindrical case 62 is placed on the rear portion of the mouse 42, and the bearing metal setting 54 is fitted into the upper portion of the cylindrical case 62. The vertical fine control handle 63 having one open end and knurling at the closed end is rotatably attached to the upper outer surface of the cylindrical case 62. Then, the hydraulic cylinder 51 is fitted into the central hole 64a of the cylinder support ring 64 the outer surface of which is fixed in the cylindrical case 62. The hydraulic cylinder 51 is constituted in the same way as the above-described fore and aft fine control operation mechanism 47 besides it has no slide mechanism.

One end of the hose 65 is connected to the hose fixture 51b of the hydraulic cylinder 51 and the other end thereof is connected to a Z-axis hydraulic cylinder 73 which will be described later.

Figure 7:
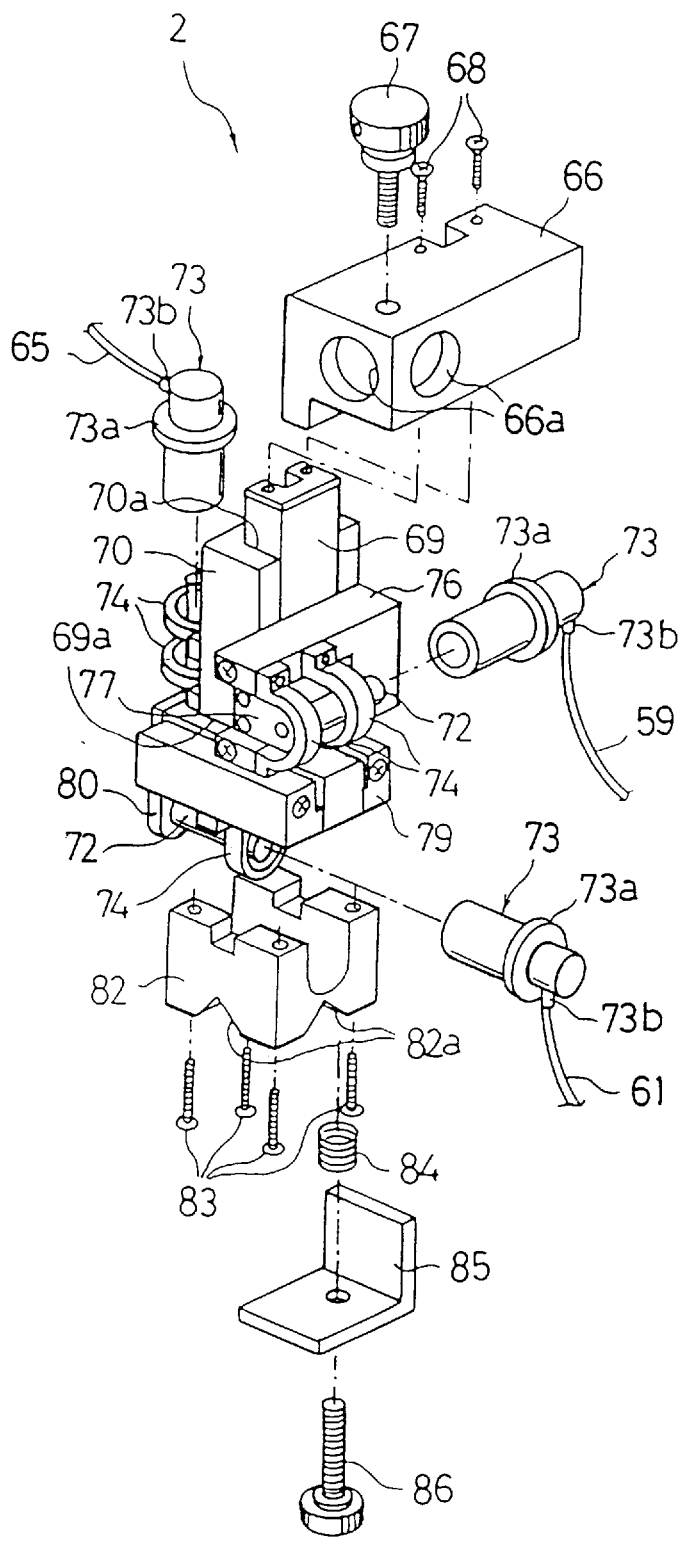
FIG. 7 is an exploded perspective view showing the micromanipulator.

FIG. 7 is an exploded perspective view of the micromanipulator. As shown in FIG. 7, the micromanipulator 2 comprises a fixed stand 66 having holes 66a at the side surfaces to which the mounting bar 4 is inserted. A fixture screw 67 for fastening the mounting bar 4 to fix the fixed stand 66 at the mounting bar 4 is screwed into the upper surface of the fixed stand 66. Further, the fixed stand 66 is fixed at the upper end of a vertical Z-axis inner slider 69 with bolts 68. The Z-axis inner slider 69 is movably placed in the Z-direction in a concave groove 70a formed at a Z-axis outer slider 70 along the vertical directions through a linear way bearing (not shown). A spring (not shown) is placed in a small grooved formed at the Z-axis inner slider 69 in the Z direction, and one end of the spring is fixed to the Z-axis inner slider 69 and the other end thereof is fixed to the Z-axis outer slider 70 so that the Z-axis outer slider 70 is always pressed upwards.

A piston fixing plate 69a is horizontally provided at the lower end of the Z-axis inner slider 69 so as to be extended to the opposite direction of the concave groove 70a of the Z-axis outer slider 70, and a piston 72 is provided so as to be stood at the piston fixing plate 69a.

Further, the hydraulic cylinder 73 is fixed at the surface of the Z-axis outer slider 70 opposite to the concave groove 70a by cylinder pressers 74 which are provided in parallel at a predetermined interval so that an opening of the hydraulic cylinder 73 is faced to the piston 72. The hydraulic cylinder 73 has a cylindrical shape with one open end and comprises a lock portion 73a at the outer surface and a hose connection opening 73b at the closed end. The lock portion 73a is in contact with the inner side surface of the cylinder pressers 74, and one end of the hose 65 is connected to the hose connection opening 73b.

Furthermore, the piston 72 is slidably fitted into the hydraulic cylinder 73, and an oil reservoir is formed between the hydraulic cylinder 73 and the piston 72. The shape and size of the oil reservoir of the hydraulic cylinder 73 are formed as same as those of the oil reservoir of the hydraulic cylinder 51 of the micromanipulator fine control apparatus 1, and the same amount of oil is contained therein.

A Y-axis outer slider 76 and a Y-axis inner slider 77 which slide in the fore and aft directions and an X-axis outer slider 79 and an X-axis inner slider 80 which slide in the left and right directions are constituted in the same way as the above-described Z-axis outer slider 70 and the Z-axis inner slider 69 which slide in the vertical directions. One end of the hose 59 is connected to the hose connection opening 73b of the hydraulic cylinder 73 fixed at the Y-axis outer slider 76, and one end of the hose 61 is connected to the hose connection opening 73b of the hydraulic cylinder 73 fixed at the X-axis outer slider 79.

The Y-axis inner slider 77 is fixed at the Z-axis outer slider 70, and the X-axis inner slider 80 is fixed at the Y-axis outer slider 76.

Then, a tightening fixture stand 82 is fixed at the lower surface of the X-axis outer slider 79 by bolts 83, and V-shaped grooves 82a facing downward are formed at the lower surface of the tightening fixture stand 82 so as to be perpendicular to each other. The tightening device 5 is inserted into the V-shaped groove 82a and fixed at the tightening fixture stand 82 with a spring 84, an L-shaped presser 85 and a tightening bolt 86.

Figure 8:
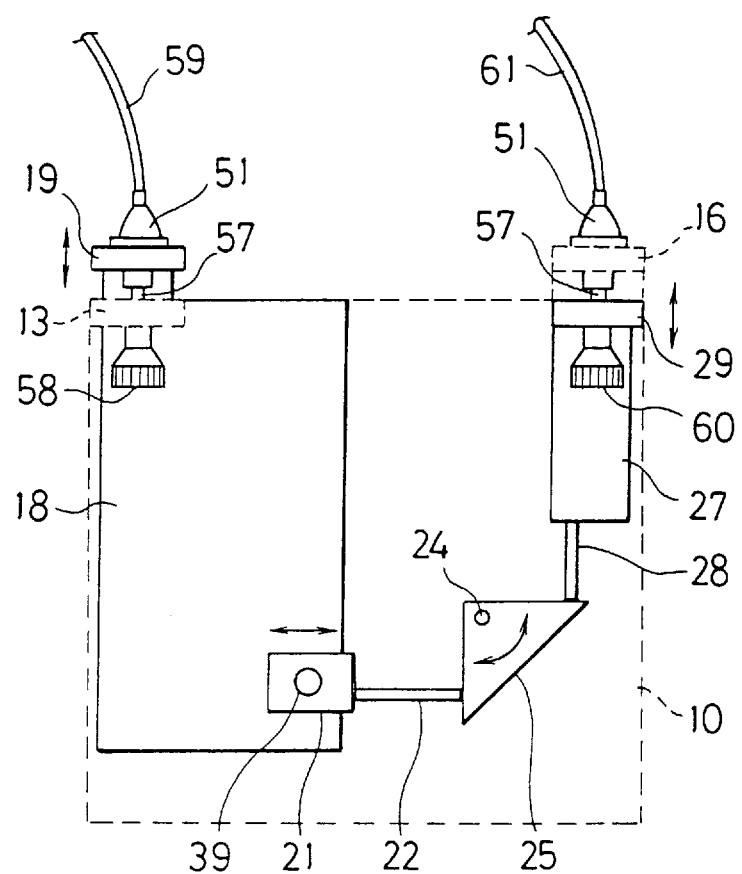
FIG. 8 is a perspective view showing the operation of the micromanipulator fine control apparatus according to the present invention.

Next, the operation of the micromanipulator fine control apparatus will be described with reference to FIG. 4 and FIG. 8. FIG. 8 is a side view showing the operation of the micromanipulator fine control apparatus.

First, when the operator holds the mouse 42 and moves it to the front, the control handle 39 is tilted to the front and the movable ball 35 is rotated to the front. Then, the fixed ball 33 is oscillated around the center C of the movable ball 35, and the fore and aft fine control slider 18 is finely moved backward. The cylinder support plate 19 and the hydraulic cylinder 51 are also moved backwards. Accordingly, the oil reservoir formed between the hydraulic cylinder 51 and the piston 57 widens, so that the forced oil immediately flows into the hydraulic cylinder 51 from the Y-axis hydraulic cylinder 73 through the hose 59 by the act of the spring extended between the Y-axis outer slider 76 and the Y-axis inner slider 77 of the micromanipulator 2.

Then, the oil reservoir between the Y-axis hydraulic cylinder 73 and the piston 72 is narrowed, so that the Y-axis outer slider 76 is finely moved to the front and the tightening fixture stand 82 is also finely moved to the front.

On the other hand, when the operator holds and moves the mouse 42 to the rear, the control handle 39 is tilted to the rear and the movable ball 35 is rotated to the rear. Then, the fixed ball 33 is oscillated around the center C of the movable ball 35, and the fore and aft fine control slider 18 is slightly moved forwards. The cylinder support plate 19 and the hydraulic cylinder 51 are also moved to the front. Accordingly, the oil reservoir formed between the hydraulic cylinder 51 and the piston 57 is narrowed, so that the forced oil immediately flows into the Y-axis hydraulic cylinder 73 of the micromanipulator 2 from the hydraulic cylinder 51 through the hose 59.

Then, the oil reservoir between the Y-axis hydraulic cylinder 73 and the piston 72 widens, so that the Y-axis outer slider 76 is finely moved backwards and the tightening fixture stand 82 is also finely moved backwards.

When the operator holds and moves the mouse 42 to the right, the control handle 39 is tilted to the right and the movable ball 35 is oscillated around the center O of the fixed ball 33. Then, the first left right fine control slider 21 and the bar 22 are finely moved to the right, and the triangular link 25 is rotated around the pin 24 counterclockwise. Then, the second left right fine control slider 27 is also finely moved backwards with the bar 28, and the handle support plate 29 and the piston 57 are also finely moved backwards. Accordingly, the oil reservoir formed between the hydraulic cylinder 51 and the piston 57 is narrowed, so that the forced oil immediately flows into the X-axis hydraulic cylinder 73 from the hydraulic cylinder 51 through the hose 61.

Then, the oil reservoir between the X-axis hydraulic cylinder 73 and the piston 72 widens, so that the X-axis outer slider 79 is finely moved to the right and the tightening fixture stand 82 is also finely moved to the front.

On the other hand, when the operator holds and moves the mouse 42 to the left, the control handle 39 is tilted to the left, and the movable ball 35 is oscillated around the center O of the fixed ball 33. Then, the first left right fine control slider 21 and the bar 22 are finely moved to the left, and the triangular link 25 is rotated around the pin 24 clockwise. Then, the second left right fine control slider 27 is also finely moved to the front with the bar 28, and the handle support plate 29 and the piston 57 are also finely moved to the front. Accordingly, the oil reservoir formed between the hydraulic cylinder 51 and the piston 57 widens, so that the forced oil immediately flows into the hydraulic cylinder 51 from the X-axis hydraulic cylinder 73 through the hose 61.

Then, the oil reservoir between the X-axis hydraulic cylinder 73 and the piston 72 is narrowed, so that the X-axis outer slider 79 is finely moved to the left and the tightening fixture stand 82 is also moved to the left.

Therefore, while the operator holds and moves the mouse 42 to the front, rear, left and right by looking through the microscope, the tip of the glass electrode 7 held by the micromanipulator 2 can finely be moved in the same discretion as the mouse 42. Accordingly, the tip of the glass electrode 7 can finely be moved in the directions the operator moves the mouse 42.

Further, as shown in FIG. 5, when the operator rotates the fore and aft fine control handle 58, the fine control screw shaft 56 is rotated, and the fine control screw shaft 56 and the piston 57 are moved in the hydraulic cylinder 51 forward and backward. Then, the amount of oil in the oil reservoir of the hydraulic cylinder 51 is varied, and the amount of oil in the oil reservoir of the Y-axis hydraulic cylinder 73 of the micromanipulator 2 connected to the hydraulic cylinder 51 through the hose 59 is also varied. Then, the Y-axis outer slider 76 and the tightening fixture stand 82 are finely moved forwards and backwards.

When the operator rotates the left right fine control handle 60, the fine control screw shaft 56 is rotated, and the fine control screw shaft 56 and the piston 57 are moved in the fore and aft directions in the hydraulic cylinder 51. Then, the amount of oil in the oil reservoir of the hydraulic cylinder 51 is varied, and the amount of oil in the oil reservoir of the X-axis hydraulic cylinder 73 of the micromanipulator 2 connected to the hydraulic cylinder 51 through the hose 61 is also varied. Then, the X-axis outer slider 79 and the tightening fixture stand 82 are finely moved in the left and right directions.

Further, as shown in FIG. 6, when the operator rotates the vertical fine control handle 63 provided at the rear portion of the mouse 42, the fine control screw shaft 56 is rotated, and the fine control screw shaft 56 and the piston 57 are vertically moved in the hydraulic cylinder 51. Accordingly, the amount of oil in the oil reservoir of the hydraulic cylinder 51 is varied and the amount of oil in the oil reservoir of the Z-axis hydraulic cylinder 73 of the micromanipulator 2 connected to the hydraulic cylinder 51 through the hose 65 is also varied. Then, the Z-axis slider 70 and the tightening fixture stand 82 are finely moved upwards and downwards.

It should be noted that in the above-described embodiments, the hydraulic cylinder is utilized in the micromanipulator fine control apparatus and the micromanipulator but other liquid-operated cylinders, e.g., a water-operated cylinder can be used.

Further, in the above-described embodiments, the hydraulic cylinder of the micromanipulator fine control apparatus and the hydraulic cylinder of the micromanipulator are formed one to one but they can be used in the ratio of 1 to 5 or other ratio.

Furthermore, the vertical fine control mechanism is provided at the rear portion of the mouse but the vertical fine control mechanism can be provided at any position of the mouse, and moreover, it can be provided on the base plate apart from the mouse.

In the above embodiments, the hydraulic cylinder 51 is provided at the cylinder support plate 16 and 19 and the piston 57 is provided at the handle support plate 13, 29; however, the piston 57 can be provided at the cylinder support plate 16 and 19 and the hydraulic cylinder 51 can be provided at the handle support plate 13, 29.

Further, in the above-described embodiments, the first left right fine control slider, the triangular link and the second left right fine control slider are used as the left right fine control slider but only the first left right fine control slider can be used and the triangular link and the second left right fine control slider which are connected to the first left right fine control slider can be omitted.

While the invention has been shown and described with reference to the illustrated embodiments, it should be understood that various changes in form and details may be made without departing from the scope of the invention which is defined in the appended claims.

What is claimed is:

1. A micromanipulator fine control apparatus for finely controlling a microtool of a micromanipulator comprising:

a first moving unit for sliding in the fore and aft directions, having a vertical through hole;

an adjusting member having a screw part to be inserted into said through hole of said first moving unit, and a fixed ball on said screw part;

a second moving unit for sliding in the left and right directions, having a vertical through hole;

a movable ball rotatably supported by said through hole of said second moving unit, said movable ball having a control handle projecting upwards and a cylindrical inner surface, said cylindrical inner surface being in contact with an outer surface of said fixed ball;

a base plate for slidably supporting said first and second moving units in the corresponding directions;

a supporting ball having a through hole, for supporting the upper portion of said control handle inserted into said through hole of said supporting ball;

a horizontal movement operating means including a tapered hollow having an opening disposed towards the base plate, and a through hole at the top of said hollow, said horizontal movement operating means being horizontally slidable on said base plate above an upper surface thereof, said horizontal movement operating means being for rotatably supporting said supporting ball at said through hole at the top of said hollow;

a fore and aft fine control liquid-operated means provided between said base plate and said first moving unit, said fore and aft fine control liquid-operated means having a first liquid-operated cylinder coupled to a fore and aft fine control liquid-operated cylinder of said micromanipulator with a first hose, and a first piston movably fitted to said first liquid-operated cylinder, said fore and aft fine control liquid-operated means for varying the amount of liquid of said first liquid-operated cylinder by moving said first moving unit; and a left right fine control liquid-operated means provided between said base plate and said second moving unit, said left right fine control liquid-operated means having a second liquid-operated cylinder coupled to a left right fine control liquid-operated cylinder of said micromanipulator with a second hose, and a second piston movably fitted to said second liquid-operated cylinder, said left right fine control liquid-operated means for varying the amount of liquid of said second liquid-operated cylinder by moving said second moving unit;

when said horizontal movement operating means is moved to the front, rear, left and right, said control handle being tilted to the front, rear, left and right, respectively; said first moving unit and said second moving unit being moved; the amount of liquid in said first liquid-operated cylinder being varied by said fore and aft fine control liquid-operated means; the amount of liquid in said second liquid-operated cylinder being varied by said left right fine control liquid-operated means; said microtool being finely moved in the same direction as the moving direction of said horizontal movement operating means.

2. A micromanipulator fine control apparatus according to claim 1, wherein said fore and aft fine control liquid-operated means comprises a first bearing metal fixed to one of said base plate and said first moving unit, a first fine control screw shaft screwed into said first bearing metal, and a fore and aft fine control handle fixed to an end of said first fine control screw shaft; and said first piston of said fore and aft fine control liquid-operated means is fixed at the end of said first fine control screw shaft; and said first piston slides in said first liquid-operated cylinder by rotating said fore and aft fine control handle;

said left right fine control liquid-operated means comprises a second bearing metal fixed to one of said base plate and said second moving unit, a second fine control screw shaft screwed into said second bearing metal, and a left right fine control handle fixed to an end of said second fine control screw shaft; and said second piston of said left right fine control liquid-operated means is fixed at the end of said second fine control screw shaft; and said second piston slides in said second liquid-operated cylinder by rotating said left right fine control handle.

3. A micromanipulator fine control apparatus according to claim 1, wherein said horizontal movement operating means comprises vertical fine control liquid-operated means for the vertical movement of said micromanipulator; and said vertical fine control liquid-operated means comprises a third liquid-operated cylinder coupled to a vertical fine control liquid-operated cylinder of said micromanipulator with a third hose, a third bearing metal, a third fine control screw shaft screwed into said third bearing metal, a vertical fine control handle fixed to an end of said third fine control screw shaft, and a third piston movably fitted to said third liquid-operated cylinder and fixed to the end of said third fine control screw shaft; said third piston slides in said third liquid-operated cylinder by rotating said vertical fine control handle.

* * * * *